Patented Sept. 5, 1922.

1,427,902

UNITED STATES PATENT OFFICE.

GRACE L. JOHNSTON, OF BROOKLYN, NEW YORK.

GRAPE JUICE.

No Drawing.      Application filed July 26, 1921. Serial No. 487,805.

*To all whom it may concern:*

Be it known that I, GRACE L. JOHNSTON, a subject of the King of Great Britain, and a resident of 17 Marlborough Road, in the borough of Brooklyn, county of Kings, State of New York, United States of America, have invented certain new and useful Improvements in Grape Juice, of which the following is a specification.

In a co-pending application Serial No. 487805 filed simultaneously herewith, I have described and claimed an improvement in grape juice product and process of making same which included the treatment of a grape juice base with a fruit acid or stabilizing ingredient whereby the coloring and flavoring ingredients of the grape juice that ordinarily in the presence of a large proportion of water become insoluble and relatively tasteless and unattractive in color, retain substantially their original properties when a large proportion of water is added to the treated base. In my co-pending application my invention was specifically described in connection with a base consisting of ordinary grape juice treated with fruit acid or fruit acid and sugar.

The present invention relates particularly to the treatment of concentrated grape juice by the addition of a stabilizing agent such as a fruit acid for the purpose among other things, of preventing the precipitation and alteration in taste and appearance of the flavoring and coloring ingredients of the grape juice.

I practice my invention and make my product as follows;

A given quantity of grape juice obtained from either fresh grapes or dried grapes is concentrated preferably to from one-third to one-fifth of its original bulk by removing the water by any well known process such as by evaporation or by freezing. If the removal of the water has been skillfully accomplished the concentrated juice will contain its original flavoring and coloring ingredients substantially unaltered but these and other ingredients contained in the concentrate will if a considerable proportion of water be added, be rendered insoluble and altered in properties so that the taste and color of the resulting mixture will be unsatisfactory and decidedly different from the original grape juice. To this concentrate I add a stabilizing agent in the shape preferably of a small proportion of tartaric or citric or other fruit acids, or a combination of these acids. The color and flavor of the grape juice is largely due to the presence in minute proportion of certain of the gala-tannic acids, certain of the tannins and certain of the volatile oils which ingredients are relatively unstable and are ordinarily decomposed in the presence of a large proportion of water. The addition of the fruit acid as above indicated so affects the coloring and flavoring ingredients of the grape juice that thereafter such ingredients remain soluble and substantially unchanged even in the presence of a large proportion of water. The tartaric or other fruit acid also serves to dissolve certain ingredients of the concentrated grape juice that give it a cloudy appearance. The added fruit acid also masks the astringency of the grape juice due to the presence of certain of the tannins some of which are of marked importance inasmuch as they contribute materially to the distinctive flavor of the grape juice. The fruit acid also adds to the brightness of the flavor taking away what is technically known as the "flat" taste of the juice. It also adds to the intensity of the original color and causes the color to remain permanent. The proportion of fruit acid added will vary somewhat with the character of the grape juice and degree of concentration. I have found that with grape juice concentrated to one third of its original bulk, one half ounce of fruit acid should be added to each gallon of concentrated juice. I have found that the fruit acid used is preferably a combination of two thirds tartaric acid and one third citric acid.

It may also be desirable to add to the concentrated grape juice a small proportion (say from 1 to 2 lbs. per gallon of concentrated juice) of sugar preferably sucrose the amount of which added sugar will be governed by the proportion of sugar existing in the concentrated grape juice which varies with different crops of grapes from which the grape juice is produced. The added sugar besides sweetening the liquid and giving body to the same, dissolves and holds in solution otherwise insoluble ingredients that would cause cloudiness and thus improve the color and flavor. It also improves the keeping quality of the product by preventing tendency to fermentation. Sucrose is the most desirable sugar to use for this purpose as it performs all of the functions above mentioned. Other forms of sugar such as glucose, especially if it can be obtained sufficiently pure may be used as they will perform some though not all of the functions. In the production of commercial grape juice it is customary to allow the grape juice to stand for several months in order to permit the argols which comprise salts of tartaric acid particularly potash and which give the juice a cloudy appearance and form a muddy sediment, to precipitate and settle to the bottom. The juice is then drawn off but still contains a small proportion of the argols which later may become precipitated tending to give the juice a somewhat cloudy appearance. The addition of the sugar as well as the addition of the fruit acid as above set forth, causes the remaining argols to remain in solution and prevents the precipitation of the same with the consequent cloudy appearance.

When concentrated grape juice has been treated as above provided with tartaric acid or other fruit acid and if desired with sugar, water may afterwards be added without causing the precipitation of the coloring and flavoring ingredients and without altering the properties of such ingredients. Thus if my concentrated product after it has been treated with the fruit acid and if desired with sugar to be diluted by the addition of a considerable proportion of water, the resulting liquid will be clear in appearance, bright in color and will retain the original flavor of the grape, all of which is in marked contrast with the product that would result from the dilution of ordinary concentrated and untreated grape juice with a large proportion of water.

It should be understood that the fruit acid should be added prior to the addition of the large proportion of water as in case water were first added to the grape juice and afterwards fruit acid or in case water and fruit acid were added to the grape juice together the desirable results above described would not be obtained.

Obviously both the base and the diluted product described herein is more expensive to make than the base and the diluted product described in my co-pending application which base consisted of a given quantity of grape juice to which is added tartaric acid and if desired a proportion of sugar. But the base or concentrate described herein when diluted with water makes a richer and heavier beverage than that described in my co-pending application.

The purpose of concentrating the grape juice as herein described and later adding water when the same is to be used as a beverage, is to permit the product to be bottled and shipped in concentrated form thus permitting a large saving in cost of containers and in freight charges.

What I claim as my invention is:—

1. A grape juice product comprising concentrated grape juice having a low water content relative to normal grape juice and a stabilizing agent.

2. A grape juice product comprising a concentrated grape juice having a low water content relative to normal grape juice and a fruit acid.

3. A grape juice product comprising a concentrated grape juice having a low water content relative to normal grape juice and tartaric acid.

4. A grape juice product comprising a concentrated grape juice having a low water content relative to normal grape juice, a fruit acid and sugar.

5. A grape juice product comprising a concentrated grape juice having a low water content relative to normal juice, a stabilizing ingredient and a large proportion of water added to the treated concentrate.

6. The process of making an improved grape juice product that consists in concentrating grape juice and adding to the concentrate a stabilizing ingredient.

7. The process of making an improved grape juice product that consists in concentrating grape juice and adding to the concentrate fruit acid.

8. The process of making an improved grape juice product that consists in concentrating grape juice and adding to the concentrate tartaric acid.

9. The process of making an improved grape juice product that consists in concentrating grape juice and adding to the concentrate fruit acid and sugar.

10. A grape juice product consisting of concentrated grape juice and fruit acid and a large proportion of water, the coloring and flavoring ingredients of the grape juice remaining soluble in the mixture.

11. A grape juice product comprising a concentrated grape juice having a low water content relative to normal grape juice and tartaric acid with citric acid.

12. The process of making an improved grape juice product that consists in concentrating grape juice by removing water and adding to the concentrate a combination of fruit acids and sugar.

GRACE L. JOHNSTON.